United States Patent
Brilliant et al.

(10) Patent No.: US 12,385,465 B2
(45) Date of Patent: Aug. 12, 2025

(54) CONNECTION JOINT FOR A SPLIT WIND TURBINE BLADE

(71) Applicant: Vestas Wind Systems A/S, Aarhus N (DK)

(72) Inventors: Nathan A. Brilliant, Arvada, CO (US); Lasse Lykkegaard, Herning (DK); Leon Barton, Newport (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/043,055

(22) PCT Filed: Aug. 12, 2021

(86) PCT No.: PCT/DK2021/050258
§ 371 (c)(1),
(2) Date: Feb. 27, 2023

(87) PCT Pub. No.: WO2022/042809
PCT Pub. Date: Mar. 3, 2022

(65) Prior Publication Data
US 2023/0323854 A1 Oct. 12, 2023

Related U.S. Application Data

(60) Provisional application No. 63/071,421, filed on Aug. 28, 2020.

(30) Foreign Application Priority Data

Sep. 16, 2020 (DK) .......................... PA 2020 70596

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05D 2230/60* (2013.01)

(58) Field of Classification Search
CPC ............................... F03D 1/0675; F03D 80/30
See application file for complete search history.

(56) References Cited

U.S. PATENT DOCUMENTS 11,248,588 B2 * 2/2022 Jensen .................... F03D 80/30
2008/0240925 A1 10/2008 Kita et al.
(Continued)

FOREIGN PATENT DOCUMENTS

EP 3581790 A1 12/2019
WO 2019206386 A1 10/2019
WO WO-2020122865 A1 * 6/2020 ........... B29C 70/446

OTHER PUBLICATIONS

International Searching Authority, International Search Report and Written Opinion issued in corresponding PCT Application No. PCT/DK2021/050258, mailed Nov. 24, 2921.
(Continued)

*Primary Examiner* — Nathaniel E Wiehe
*Assistant Examiner* — Aye S Htay
(74) *Attorney, Agent, or Firm* — Wood Herron & Evans LLP

(57) ABSTRACT

A split wind turbine blade includes a connection joint for coupling a first and a second blade portion together. At least one of the blade portions includes electrically conductive material, and a hole formed in an end surface of the blade portion. A portion of the electrically conductive material is revealed on a surface of the hole. The connection joint includes a metal insert embedded in the hole such that the metal insert 10 forms an electrical path with the electrically conductive material revealed on the surface of the hole.

19 Claims, 10 Drawing Sheets

(56) References Cited

U.S. PATENT DOCUMENTS

| | | | |
|---|---|---|---|
| 2009/0114337 A1* | 5/2009 | Llorente Gonzalez | ................... B29C 33/76 156/185 |
| 2009/0116962 A1* | 5/2009 | Pedersen | .................. F03D 7/02 416/61 |
| 2009/0121491 A1* | 5/2009 | Mikkelsen | .............. F03D 80/30 290/55 |
| 2009/0208341 A1 | 8/2009 | Llorente Gonzalez et al. | |
| 2009/0324420 A1* | 12/2009 | Arocena De La Rua | ................... B29C 70/86 264/274 |
| 2011/0305574 A1* | 12/2011 | Stiesdal | .................. F03D 1/065 416/146 R |
| 2012/0100002 A1 | 4/2012 | Kawasetsu et al. | |
| 2013/0236321 A1* | 9/2013 | Olthoff | ................. F03D 1/0675 416/223 R |
| 2017/0089324 A1* | 3/2017 | Sanz Pascual | ............ F03D 1/06 |
| 2017/0234297 A1 | 8/2017 | Spieth | |
| 2019/0032634 A1 | 1/2019 | Monreal Lesmes et al. | |

OTHER PUBLICATIONS

Danish Patent and Trademark Office, Technical Examination Report issue in corresponding Danish Application No. PA 2020 70596, dated Mar. 9, 2921.

* cited by examiner

CONNECTION JOINT FOR A SPLIT WIND TURBINE BLADE

FIELD OF THE INVENTION

The present invention relates to a wind turbine blade, and in particular a connection joint for coupling a first and a second blade portion to form an electrical path; and a method of manufacturing a wind turbine blade.

BACKGROUND OF THE INVENTION

Wind turbines are susceptible to lightning strikes. The blades are particularly susceptible to lighting strikes. As a result, it is common for a wind turbine to include a lighting protection system that electrically couples the wind turbine components to the ground. This lightning protection system may include lightning receptors and conductors that are electrically connected, through the tower and nacelle, to ground.

It is known to construct wind turbine blades using separable spanwise blade portions, which are joined together in order to facilitate transport of large wind turbine blades.

SUMMARY OF THE INVENTION

A first aspect of the invention provides a wind turbine blade comprising:
  a first blade portion having a shell that defines a suction side, a pressure side, a leading edge, and a trailing edge of the blade, and a first blade portion end surface at one end of the first blade portion and having a hole formed therein, the first blade portion further comprising an electrically conductive material, wherein a portion of the electrically conductive material is revealed on a surface of the hole;
  a second blade portion having a shell that defines a suction side, a pressure side, a leading edge, and a trailing edge of the blade, the second blade portion further including a second blade portion end surface at one end of the second blade portion, wherein the first blade portion and the second blade portion are configured to be coupled together at the first and second blade portion end surfaces; and
  a connection joint for coupling the first and second blade portions together, wherein the connection joint comprises:
    a metal insert embedded in the hole of the first blade portion such that the metal insert forms an electrical path with the electrically conductive material revealed on the surface of the hole.

A further aspect of the invention provides a method of manufacturing a wind turbine blade comprising:
  providing a first blade portion having a shell that defines a suction side, a pressure side, a leading edge, and a trailing edge of the blade, and a first blade portion end surface at one end of the first blade portion, the first blade portion further comprising an electrically conductive material and a hole formed in the first blade portion end surface, wherein a portion of the electrically conductive material is revealed on a surface of the hole, and with an metal insert embedded in the hole to form an electrical path between the metal insert and the electrically conductive material revealed on the surface of the hole;
  providing a second blade portion having a shell that defines a suction side, a pressure side, a leading edge, and a trailing edge of the blade, the second blade portion further including a second blade portion end surface at one end of the second blade portion;
  bringing the first and second blade portions together such that the first blade portion end surface is adjacent the second blade portion end surface; and,
  coupling the first and second blade portions together by the metal insert.

The electrical path avoids any potential difference between the metal insert and the electrically conductive material. By forming the electrical path between the metal insert and the electrically conductive material revealed on the surface of the hole, the risks of voltage rises and flashover are mitigated or obviated as there is a reliable electrical path through the connection joint and between a metal insert and the electrically conductive material revealed on the surface of the hole into which the insert is placed. The reliable electrical path may be quantifiable and repeatable during the design and manufacturing process.

The hole is formed in the electrically conductive material. The electrically conductive material revealed on the surface of the hole is the material in which the hole is defined.

The electrically conductive material revealed on the surface of the hole is a separate entity to the metal insert.

Preferably, the hole formed in the first blade portion end surface has a generally circular profile, and is formed as a bore.

Preferably, the metal insert comprises a threaded portion.

Optionally, the electrically conductive material comprises carbon fibres, preferably the carbon fibres are comprised in a fibre composite body of the first blade portion. Preferably, the electrically conductive material revealed on the surface of the hole comprises the carbon fibres.

Optionally, the metal insert forms an interference fit with the surface of the hole to provide the electrical path between the metal insert and the electrically conductive material revealed on the surface of the hole.

Optionally, the interference fit is formed along only a portion of a length of the metal insert embedded in the hole.

Optionally, the wind turbine blade further comprises an electrically conductive adhesive bonding the metal insert in the hole, wherein the electrically conductive adhesive provides the electrical path between the metal insert and the electrically conductive material revealed on the surface of the hole.

Optionally, the electrically conductive adhesive is provided along only a portion of a length of the metal insert embedded in the hole.

Optionally, the wind turbine blade further comprises an electrically conductive member bridging a gap between the metal insert and the surface of the hole, wherein the electrically conductive member provides the electrical path between the metal insert and the electrically conductive material revealed on the surface of the hole.

Optionally, the electrically conductive member is permeable.

Optionally, the electrically conductive member is permeable to a flowable adhesive when bonding the insert in the hole.

Optionally, the electrically conductive member is deformable.

Optionally, the electrically conductive member is positioned and/or retained in a recess formed in the hole and/or metal insert.

Optionally, the electrically conductive member is a circumferential collar arranged between the hole and the metal insert.

Optionally, the electrically conductive member is a spring.

Optionally, the spring is a canted spring.

Optionally, the wind turbine blade further comprises a plurality of the electrically conductive members.

Optionally, the metal insert is bonded in the hole with an adhesive.

Optionally, the metal insert has a tubular portion with an outer surface and an inner surface, and both the outer surface and the inner surface are bonded in the hole with an adhesive.

Optionally, the hole is a blind hole, and the electrically conductive insert has a tip end nearest a blind end of the blind hole, and the electrical path is formed between the tip end of the electrically conductive insert and the blind end of the blind hole.

Optionally, the metal insert has a tubular portion with an outer surface and an inner surface, and wherein the electrical path is formed between the surface of the hole and only the outer surface of the insert and not the inner surface of the insert.

Optionally, the second blade portion further comprises a second electrically conductive material and a second hole formed in the second blade portion end surface, wherein a portion of the second electrically conductive material is revealed on a surface of the second hole; and wherein the connection joint further comprises: a second metal insert embedded in the second hole such that the second metal insert forms a second electrical path with the second electrically conductive material revealed on the surface of the second hole; and a fastener arranged to join the first metal insert to the second metal insert.

Optionally, the first blade portion further comprises an elongate fibre composite body, and the elongate fibre composite body comprises the electrically conductive material at one end of the elongate fibre composite body. Optionally, the elongate fibre composite body is a spar cap.

Optionally, the wind turbine blade further comprises a lightning protection system, wherein the metal insert is connected to the lightning protection system via the electrical path between the electrically conductive insert and the electrically conductive material revealed on the surface of the hole.

Optionally, the method of manufacturing the wind turbine blade further comprises: machining the hole in the electrically conductive material after curing the electrically conductive material in the shell of the first blade portion; introducing the metal insert into the hole; adhesively bonding the metal insert in the hole; and forming the electrical path between the metal insert and the electrically conductive material revealed on the surface of the hole.

Optionally, the second blade portion further comprises a second electrically conductive material and a second hole formed in the second blade portion end surface, wherein a portion of the second electrically conductive material is revealed on a surface of the second hole, and with a second metal insert embedded in the second hole to form a second electrical path between the second metal insert and the second electrically conductive material revealed on the surface of the second hole; and the step of coupling the first and second blade portions together further comprises: fastening the metal insert to the second metal insert.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
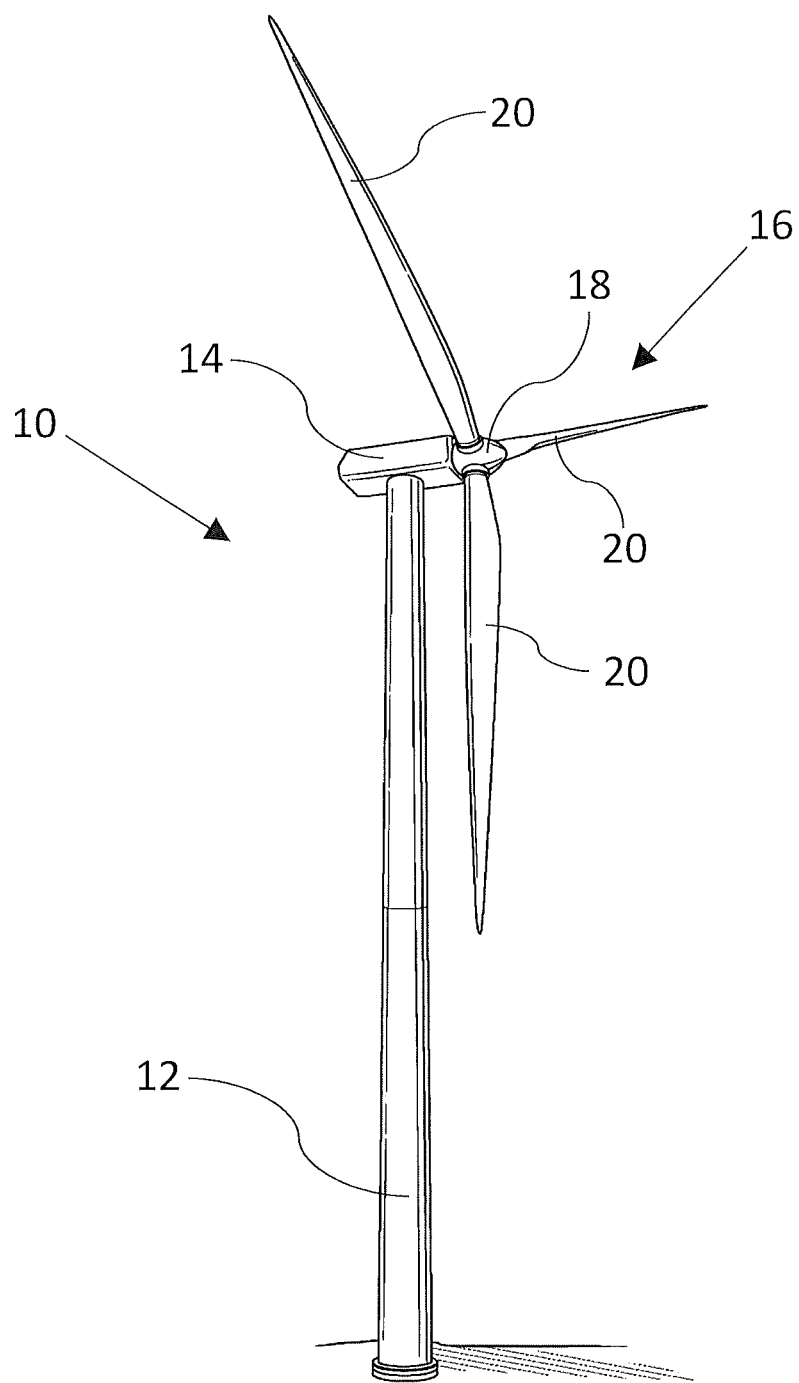
FIG. 1 shows a wind turbine.

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction. The term chordwise is used to refer to a direction from the leading edge to the trailing edge, or vice versa.

A pressure surface (or windward surface) of a wind turbine blade is a surface between the leading edge and the trailing edge, which, when the blade is in use, has a higher pressure than a suction surface of the blade.

A suction surface (or leeward surface) of a wind turbine blade is a surface between the leading edge and the trailing edge, which will have a lower pressure acting upon it than that of a pressure surface, when the blade is in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the first and second spar caps may form part of the load bearing structure extending in the longitudinal direction that carries the flap-wise bending loads of the blade.

The term shear web is used to refer to a longitudinal, generally spanwise extending, reinforcing member of the blade that can transfer load from one of the windward and leeward sides of the blade to the other of the windward and leeward sides of the blade.

The term interference fit is used to define a fit between two parts in which the external dimension of one part slightly exceeds the internal dimension of the other part into which it has to fit.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled to a generator (not shown) housed inside the nacelle 14, optionally with a gearbox between the rotor and the generator. The rotor 16 includes a central hub 18 and a plurality of rotor blades 20, which project outwardly from the central hub 18. It will be noted that the wind turbine 10 is the common type of horizontal axis wind turbine (HAWT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
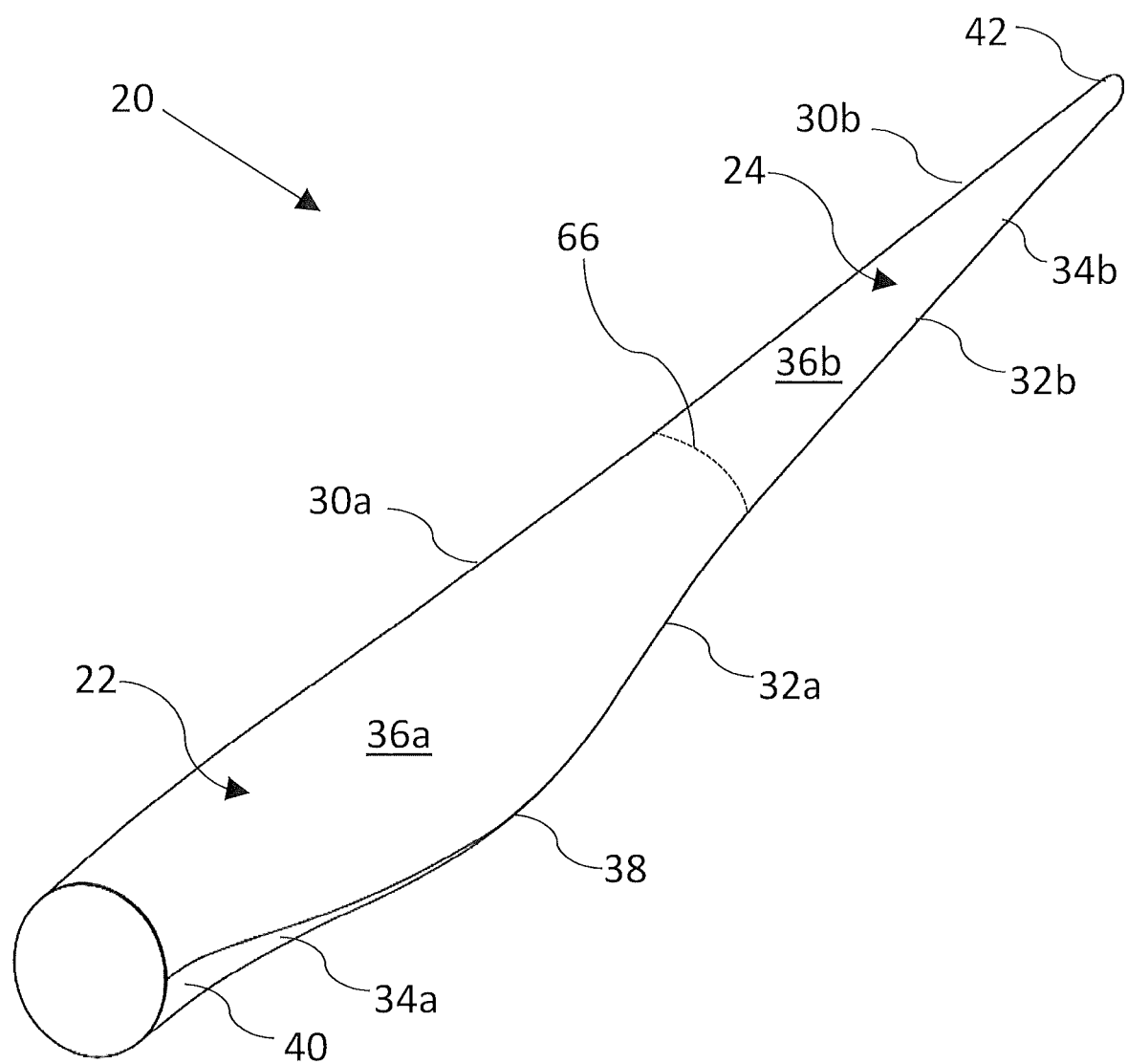
FIG. 2 shows a split wind turbine blade.

FIG. 2 illustrates one of the wind turbine blades 20 for use in such a wind turbine. The blade 20 is a split wind turbine blade formed of a first portion 22 and a second portion 24. Each blade 20 has a root end 40 proximal to the hub 18 and a tip end 42 distal from the hub 18. Each blade portion 22, 24 includes a leading edge 30a, 30b and a trailing edge 32a, 32b that extend between the root end 40 and tip end 42. Each blade portion 22, 24 comprises a suction surface 34a, 34b, and a pressure surface 36a, 36b. A thickness dimension of the blade extends between the suction surface 34a, 34b and the pressure surface 36a, 36b.

Each blade has a cross section which is substantially circular near the root end 40, because the blade near the root must have sufficient structural strength to support the blade outboard of that section and to transfer loads into the hub 18. The blade 20 transitions from a circular profile to an aerofoil profile moving from the root end 40 of the blade towards a "shoulder" 38 of the blade, which is the widest part of the blade where the blade has its maximum chord. The blade 20 has an aerofoil profile of progressively decreasing thickness in an outboard portion of the blade, which extends from the shoulder 38 to the tip end 42.

The first portion 22 and second portion 24 of the blade 20 may be connected at a connection joint indicated by connection line 66. The connection line 66 between the first and second blade portions 22, 24 may be a spanwise split, with the connection line 66 being chordwise. As will be described below, the connection joint includes a metal insert fixed and embedded in electrically conductive material of the blade. An electrical path is created between the metal insert and the electrically conductive material of the blade so as to avoid any potential difference between the metal insert and the electrically conductive material, to minimise or obviate the risks of voltage rises and flashover in the event of a lightning strike.

As will be described below, each wind turbine blade portion 22, 24 may be manufactured separately. Alternatively the blade portions 22, 24 may be manufactured together in the same mould and then split, e.g. by cutting the blade into the two blade portions. Each blade portion 22, 24 may then be transported to a site for erection of the wind turbine. The blade portions may then be joined together at the erection site to form the completed blade 20 before each blade is mounted to the hub 18 to form the rotor 16 of the wind turbine. The blade portions may also be coupled while a portion of the blade 20 is connected to the hub 18. This can reduce the load which is needed to be lifted by a crane and can also allow replacement of only a portion of a blade, for example if a tip portion has been damaged.

The first blade portion 22 has a leading edge 30a, a trailing edge 32a, a suction surface 34a and pressure surface 36a. The first blade portion 22 extends from the blade root to the connection line 66. The second blade portion 24, extending from the blade connection line 66 to the blade tip 42, has a leading edge 30b, a trailing edge 32b, a suction surface 34b and pressure surface 36b. The connection joint may be covered by a fairing, which may provide a surface over the joint with minimal worsening of the aerodynamic profile of the two blade portions 22, 24.

While the example shown in FIG. 2 has two blade portions, it will be understood that a blade may have three or more blade portions with a connection joint between adjacent blade portions.

While the first wind turbine blade portion 22 is shown as being nearer the root of the blade 20 and the second wind turbine blade portion 24 is shown as being nearer the tip of the wind turbine blade 20, the labels "first" and "second" are not intended to be limiting and any specific property disclosed as being associated with the first or second wind turbine blade portion may be applied to the other wind turbine blade portion.

Figure 3:
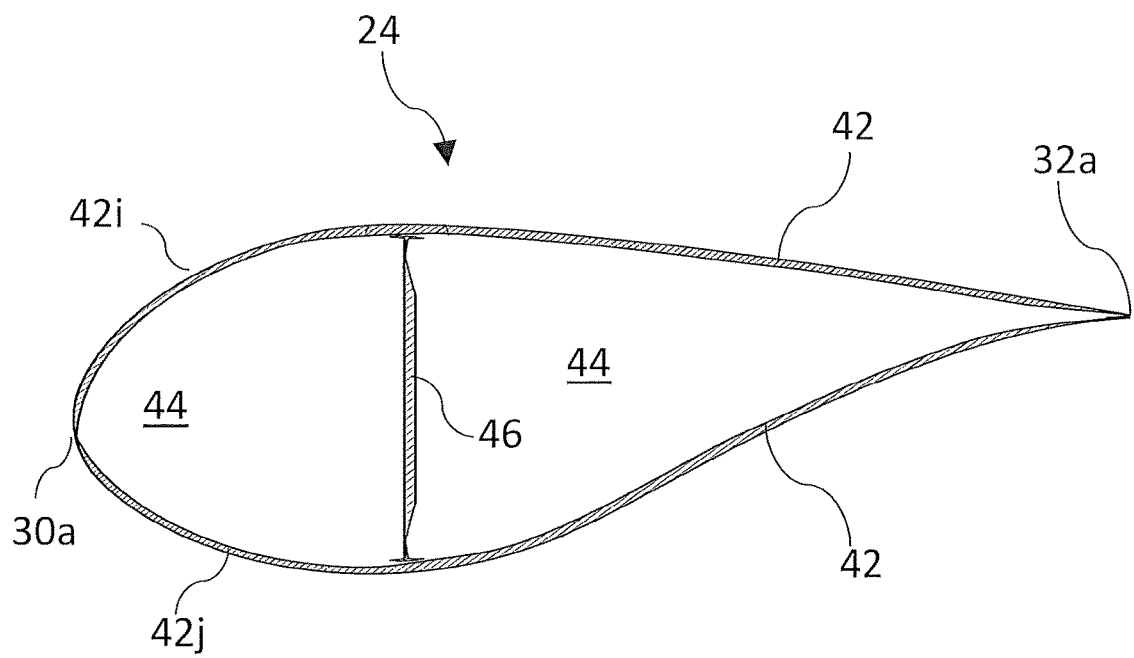
FIG. 3 shows a cross-section of the wind turbine blade.

FIG. 3 shows a cross-section of the first wind turbine blade portion 22, although it will be understood that the second wind turbine blade portion 24 is similar in construction. The first wind turbine blade portion 22 includes an outer blade shell 42 defining a hollow interior space 44 with a shear web 46 extending internally between upper and lower parts of the blade shell 42. The blade shell 42 may comprise two half-shells 42i, 42j which are separately moulded before being joined together (for example at the leading edge 30a and the trailing edge 32a) to form the blade portion 22. It will be appreciated that the blade shell 42 need not be formed as two half-shells which are subsequently joined together but may be formed as a unitary shell structure, together with the shear web 46, in a "one shot" single shell process. The blade shell 42 may include a laminate composite material such as glass fibre and/or carbon fibre for example.

Figure 4A:
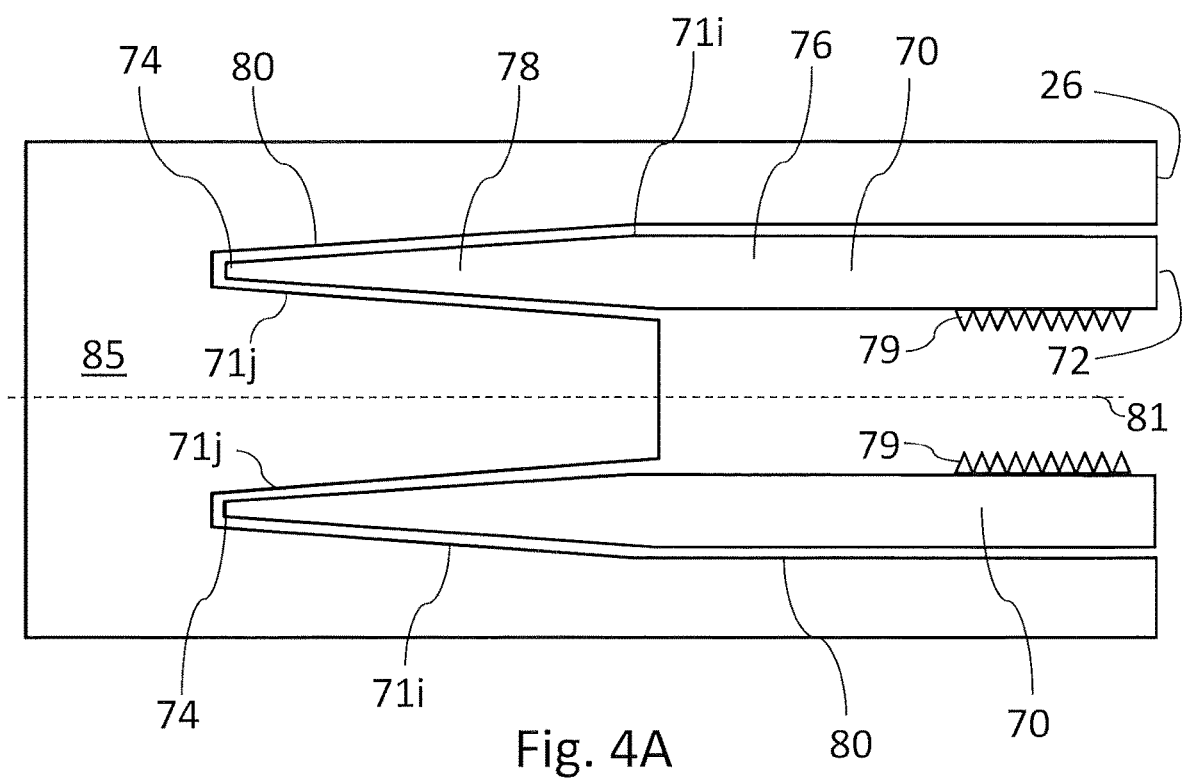
FIG. 4A shows part of the connection joint between two portions of the wind turbine blade.

As previously discussed, the blade 20 comprises at least two blade portions 22, 24. FIG. 4A shows a section of the first blade portion 22, and in particular a part of the connection joint for coupling the first blade portion 22 to a second blade portion 24.

The connection joint includes a metal insert 70 embedded in a hole 80 formed in an end surface 26 of a composite body 85 of the first blade portion 22. The composite body 85 may typically be a spar cap of the blade portion 22. In the example shown in FIG. 4A, the metal insert 70 and hole 80 may have a generally circular profile, as indicated by the axis of the hole 81 that is coincident with the axis of the metal insert 70, although the metal insert 70 and hole 80 may be any suitable shape.

The metal insert 70 may be bonded in position inside the hole 80 using an adhesive (not shown). The electrically conductive insert 70 may have a tubular profile with an outer surface 71i and an inner surface 71j. Typically, both the outer surface 71i and the inner surface 71j of the tubular portion are bonded in the hole with an adhesive.

The metal insert 70 may have an end surface 72 at the root end of the metal insert 70, which is substantially coincident with the end surface 26 of the blade portion 22 when the insert 70 is fully inserted (embedded) into the hole 80. At an opposing end of the metal insert 70 may be a tip end 74 of the metal insert 70. The metal insert may include a cylindrical portion 76 adjacent the end surface 72 of the metal insert 70, in which the cross-sectional area of the metal insert 70 is substantially constant. The metal insert may further include a tapered portion 78 adjacent the tip end 74 of the metal insert 70, in which the cross-sectional area decreases from the cylindrical portion 76 towards the tip end 74.

Figure 4B:
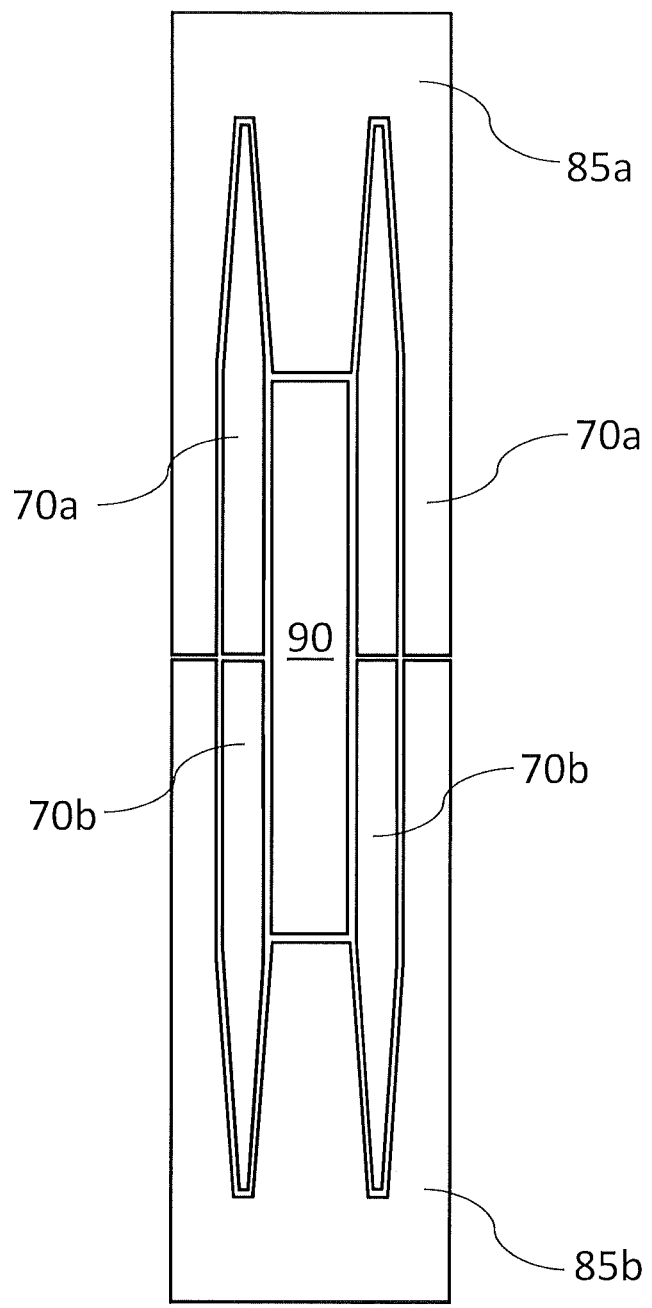
FIG. 4B shows the connection joint between two portions of the wind turbine blade.
Figure 5:
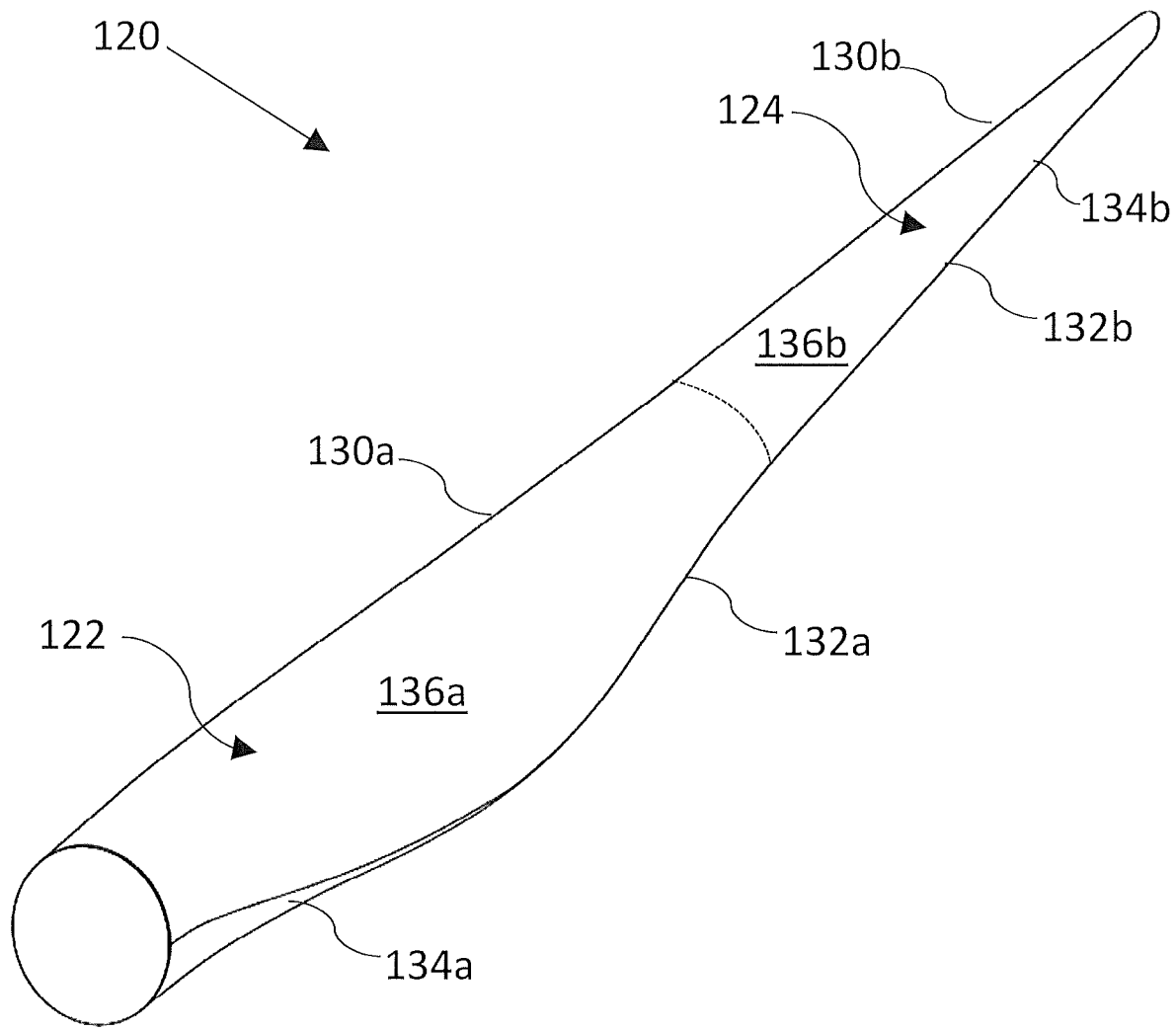
FIG. 5 shows a wind turbine blade in which an electrical path is formed across the connection joint.

The metal insert 70 may include a threaded portion 79 within an internal hollow or bore of the metal insert 70. The threaded portion 79 may be arranged to connect to a fastener 90, as shown in FIG. 4B, which may connect the first and second blade portions 22, 24 together.

The metal insert 70 and surface of the hole 80 may be separated (along at least a portion of the length of the insert) by a layer of non-electrically conductive adhesive (not shown), which couples the respective parts together. This may form an electrically insulating boundary between the metal insert and the electrically conductive material in which the hole is formed. In some examples, the metal insert 70 may additionally or alternatively include a grooved section (not shown), to which a set of fibrous plies and filamentary material (not shown) are wrapped around the grooved section of the metal insert 70 to form a transition layer around the metal insert 70 that is anchored into the grooves of the groove section. This helps to integrate the metal insert 70 into the surrounding composite material of the surface of the hole 80.

The second portion 24 of the blade 20 may be similarly arranged, or a different type of connection joint may be provided. The two blade portions 22, 24 can be connected together with one or more fasteners 90, as shown in FIG. 4B.

A first metal insert 70a may be coupled to and between a composite body 85a of the first blade portion 22 and a first end of the fastener 90. A second metal insert 70b may be coupled to and between a composite body 85b of the first blade portion 24 and a second end of the fastener 90. Alternatively, the connection joint may be asymmetric between the connection to the first and second blade portions.

Whilst the metal insert 70 and the composite body 85 of the first blade portion 22 may each be connected to a lightning protection system (not shown) that electrically couples the wind turbine components to the ground, the adhesive layer, and any other materials between the insert 70 and the hole 80, such as the transition layer described above, may prevent a direct electrical connection being made across the connection joint. If an irregular or unreliable electrical connection were made between the metal insert 70 and the composite body 85 of the blade portion 22, there may be a risk of voltage rises and flashover.

FIGS. 5 to 14 show examples in which a direct connection is formed between a metal insert 170 and the surface of a hole 180 in a wind turbine blade portion 122, 124. Similar reference numerals are used to denote similar parts with the example of FIGS. 4A and 4B but numbered in the 100 series.

In these examples, the risks of voltage rises and flashover are mitigated by purposefully providing an electrical path between a metal insert 170 and electrically conductive material, e.g. of a composite body, of at least one or both adjacent blade portions 122, 124.

The wind turbine blade 120 is substantially the same as the blade 20 described in relation to FIGS. 2 to 4. The blade 120 has a first blade portion 122 and a second blade portion 124. The first blade portion 122 has a shell that defines a leading edge 130a, a trailing edge 132a, a suction surface 134a, and a pressure surface 136a of the blade 120, and a first blade portion end surface 126 at one end of the first blade portion 122 with a hole 180 formed therein. It will be understood that the second blade portion 124 is substantially the same as the first blade portion 122, having a shell that defines a leading edge 130b, a trailing edge 132b, a suction surface 134b, and a pressure surface 136b of the blade 120, and a second blade portion end surface at one end with a hole formed therein.

The first blade portion 122 includes a composite body 185. The composite body 185 may be an elongate fibre composite body that extends along the majority of the length of the blade portion 122. The composite body 185 may be a spar cap. The composite body 185 includes electrically conductive material, for example carbon fibres and/or an electrically conductive matrix, and a portion of the electrically conductive material may be revealed on a surface of the hole 180.

A metal insert 170 is embedded in the hole 180 such that the electrically conductive insert 170 forms an electrical path with the electrically conductive material revealed on the surface of the hole 180. The fastener 90 may also be electrically conductive, such that joining a metal insert 170 of the first blade portion 22 with a metal insert 170 of the second blade portion 24, via the fastener 90, ensures there is no potential difference across the components of the connection joint.

One or more of the metal inserts 170 and fastener 90 may be connected to a lightning protection system (not shown) of the wind turbine blade 20 via the electrical path between the insert 170 and the electrically conductive material revealed on the surface of the hole 180.

The wind turbine blade may be manufactured by bringing the first and second blade portions 122, 124 together such that the first blade portion end surface 172 is adjacent the second blade portion end surface 172. The connection joint may then be formed by coupling the first and second blade portions 122, 124 together by the electrically conductive metal insert 170. Embedding and fixing the electrically conductive metal insert 170 in the hole 180 of the first blade portion 122 is performed such that an electrical path is formed between the metal insert 170 and the electrically conductive material revealed on the surface of the hole 180.

In some examples, the electrical conductivity of the surface of the hole 180 may be increased by machining the hole 180, preferably after the composite body 185 has cured. The machining may include, for example, cutting, milling or abrading the surface of the hole 180. This helps to expose a greater number of the carbon fibres, or other conductive materials of the composite body 185, on the surface of the hole 180, and thereby improve the electrical connection with the insert 170.

Figure 6:
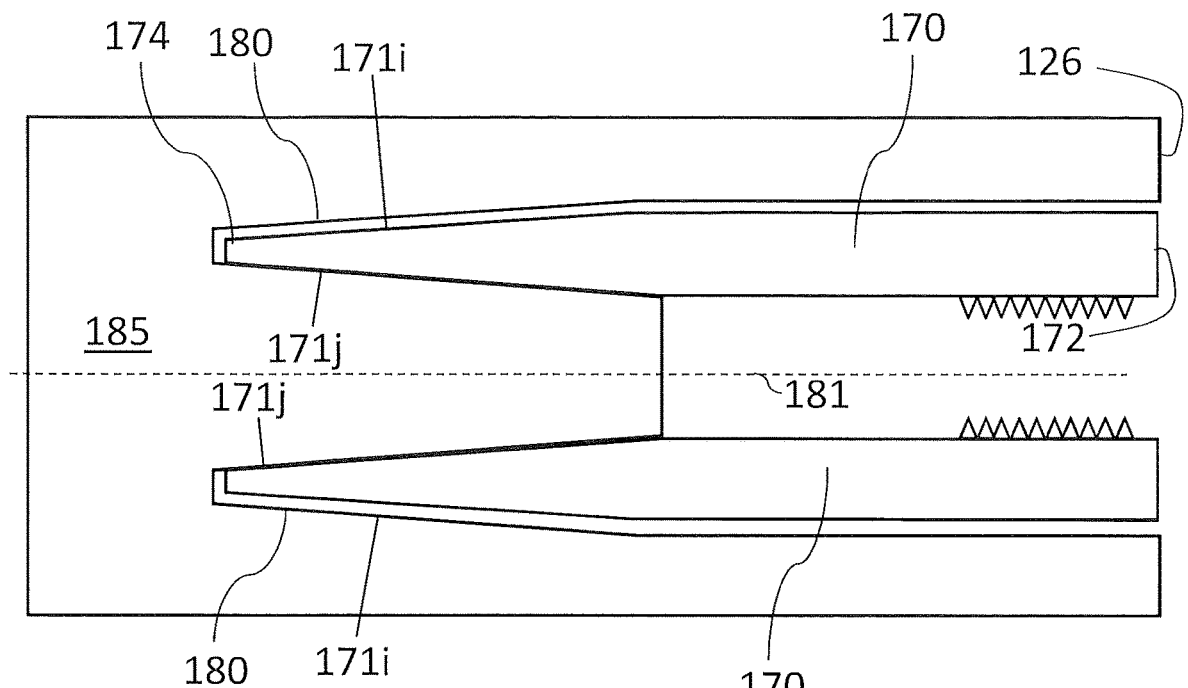
FIG. 6 shows part of the connection joint with an interference fit according to a first example.

FIG. 6 shows part of the connection joint between the metal insert 170 and the composite body 185 of the first blade portion 122, although it will be appreciated that part of the connection joint incorporating the second blade portion 124 may be the same or similar, or may be differently constructed.

In this example, the metal insert 170 forms an interference fit with the surface of the hole to provide an electrical path between the electrically conductive metal insert and the electrically conductive material revealed on the surface of the hole 180.

An interference fit is a fit between two parts in which the external dimension of one part, in this case the metal insert 170, slightly exceeds the internal dimension of the other part into which it has to fit, in this case the dimensions of the hole 180, prior to assembly. The interference fit needs to be designed carefully to avoid undesirable loads developing during the assembly of the metal insert within the blade portion.

Figure 7:
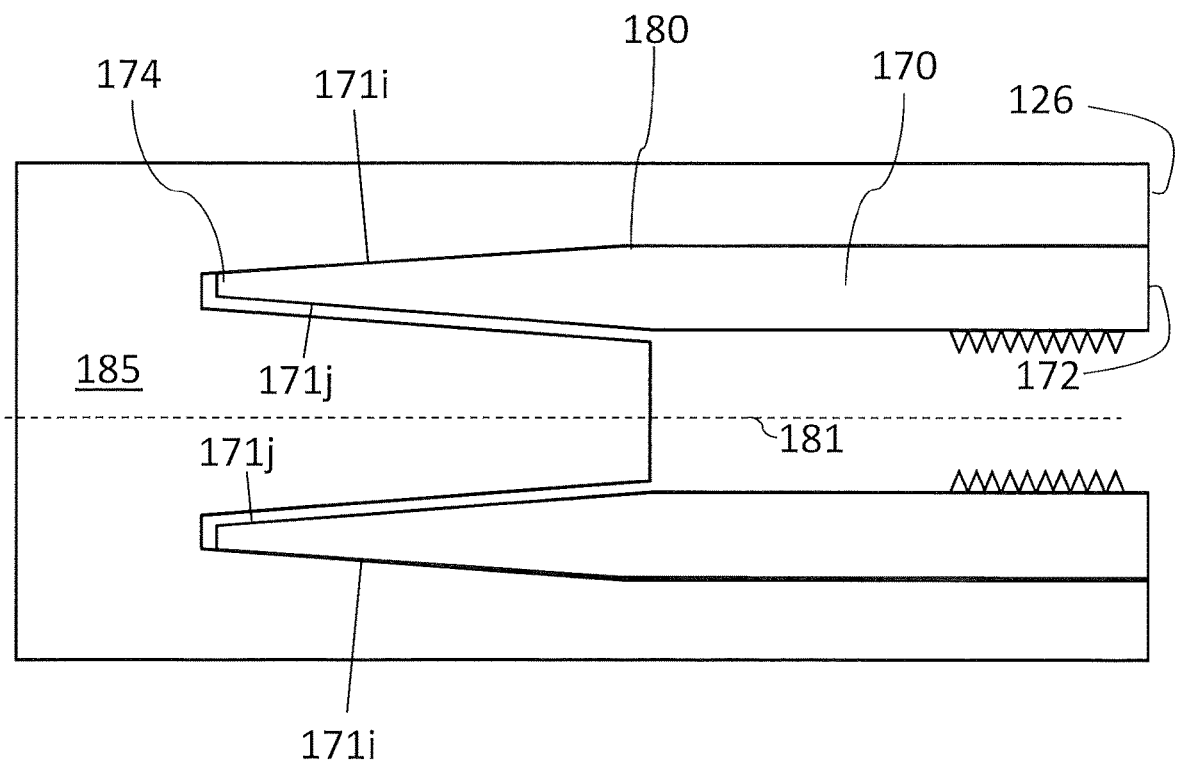
FIG. 7 shows part of the connection joint with an interference fit according to a second example.

The interference fit is provided between an inwardly facing surface 171*j* of the metal insert 170 and an outwardly facing surface of the hole 180, although it will be clear the interference fit may be formed between any adjacent surfaces of the metal insert 170 and the hole 180. For example, FIG. 7 shows an example in which the interference fit is between an outwardly facing surface 171*i* of the metal insert 170 and an inwardly facing surface of the hole 180. Reference to inwardly and outwardly facing is with reference to the longitudinal axis 181 of the hole.

In some examples, the interference fit is formed along only a portion of the length of the metal insert 170 embedded in the hole 180, for examples less than half of the length of the metal insert 170. In this case, an adhesive may be used where there is no interference fit. Alternatively, the interference fit may be formed along substantially the whole length of the metal insert 170.

Figure 8A:
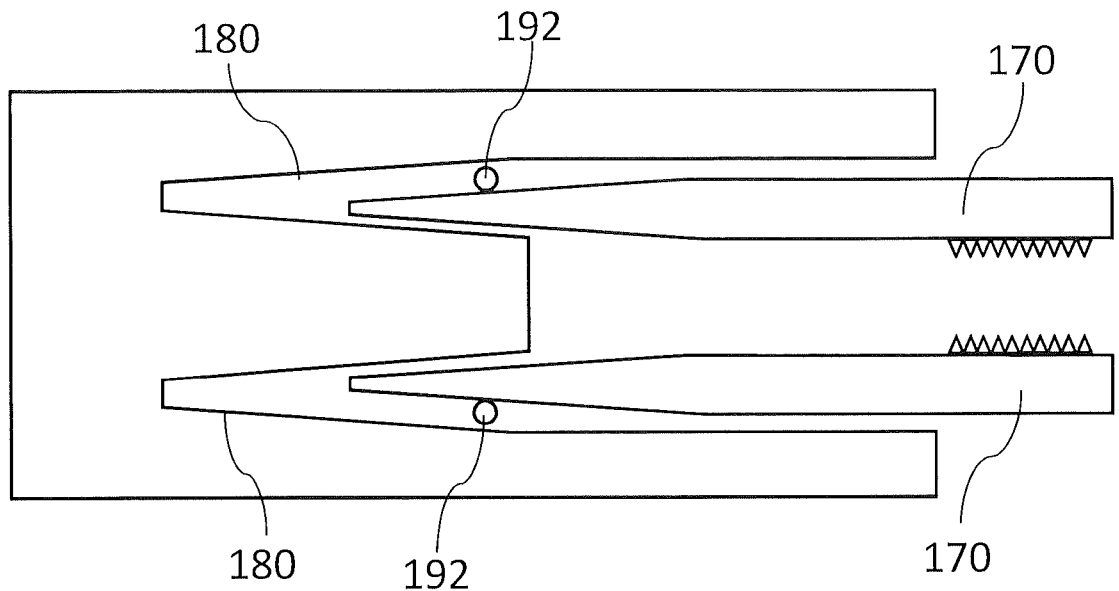
FIG. 8A shows part of the connection joint with an electrically conductive member according to a third example.
Figure 8B:
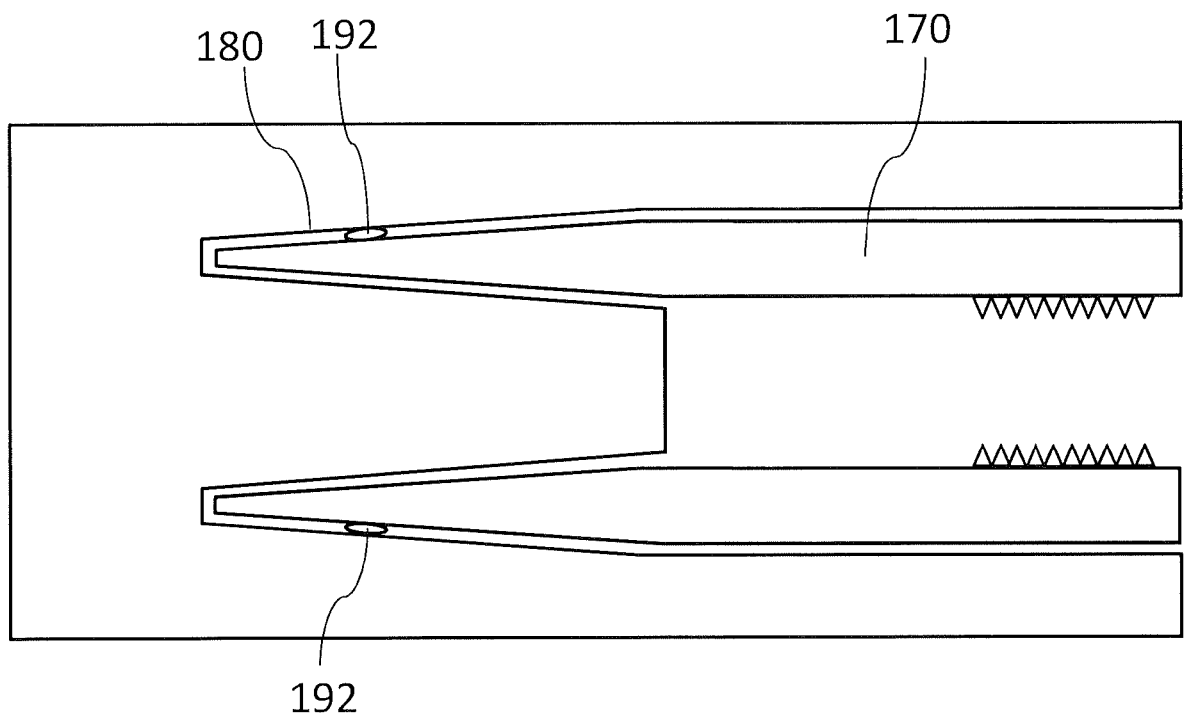
FIG. 8B shows the electrically conductive member in a deformed assembly position.

FIGS. 8A and 8B show an example in which an electrical path between the metal insert 170 and the electrically conductive material revealed on the surface of the hole 180 is formed by an electrically conductive member 192 bridging a gap between the metal insert 170 and the surface of the hole 180.

The conductive member 192 is arranged between the hole 180 and the metal insert 170 when the insert 170 is embedded in the hole 180. The conductive member 192 may be a circumferential collar that extends around the circumference of the metal insert 170, as shown in FIGS. 8A and 8B. The conductive member 192 may be pre-attached to the metal insert 170 or hole 180 prior to final assembly of the connection joint. The electrically conductive insert 192 may be bonded in the hole 180 with an adhesive and/or bonded to the metal insert 170 with an adhesive.

As shown in FIG. 8B, the electrically conductive member 192 may be deformable such that, when the metal insert 170 is embedded in the hole 180, the electrically conductive member 192 deforms and flattens between the surfaces of the insert 170 and hole 180 in order to form a better contact with the respective surfaces of the metal insert 170 and hole 180. This ensures a good electrical path is formed between the parts.

The electrically conductive member 192 may be permeable. For example, the electrically conductive member 192 may be permeable to a flowable adhesive. By providing a conductive member 192 that is permeable to an adhesive, the adhesive is able to flow through the conductive member 192 and ensure the adhesive is evenly distributed over the bonding surface.

The metal insert 170 may have a recess 194 formed in the metal insert 170, for example the recess 194 may be formed on an outer surface 171*i* or an inner surface 171*j* of the metal insert 170. The recess 194 may be a circumferential recess that extends around the circumference of the metal insert 170. Alternatively, or in addition, a recess may be formed in the hole 180.

Figure 9:
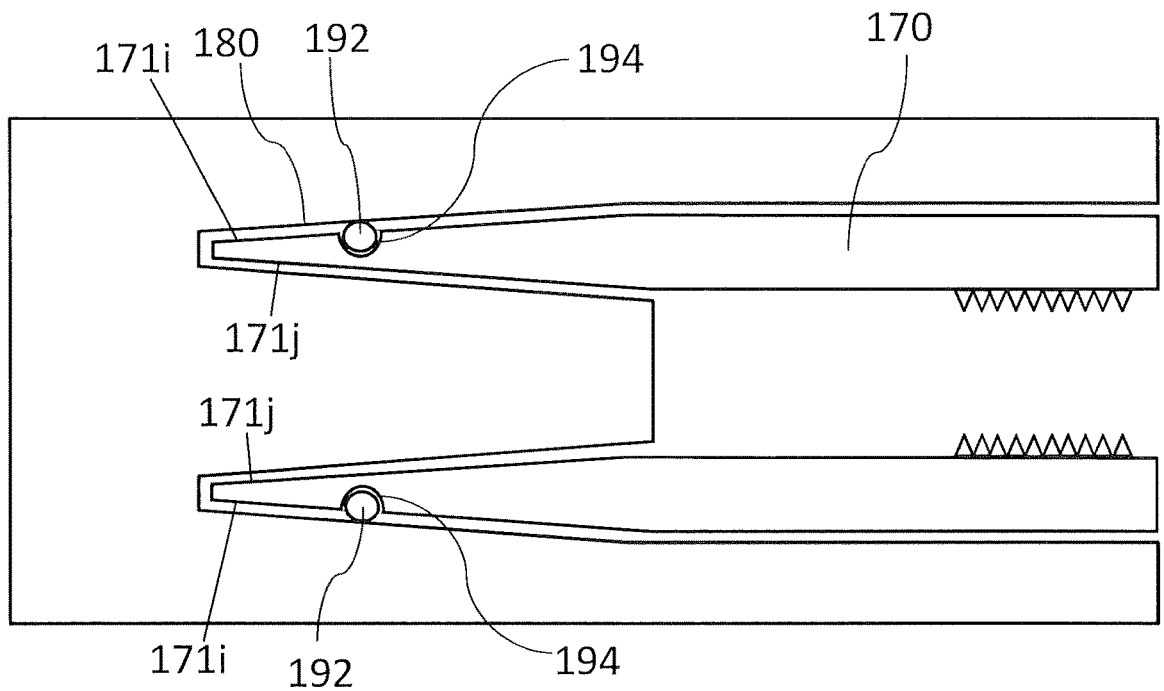
FIG. 9 shows part of the connection joint with an electrically conductive member positioned in a recess according to a fourth example.

The electrically conductive member 192 may be positioned in the recess 194 formed in the hole 180 and/or electrically conductive insert 170, as shown in FIG. 9. The electrically conductive member 192 may be retained in the recess 194 or recesses 194, for example the electrically conductive member 192 may be retained using adhesive.

The metal insert 170 may have a tubular profile, having an outer surface 171*i* and an inner surface 171*j*. The electrically conductive member 192 may be positioned adjacent the outer surface 171*i*, such that an electrical path is formed between the surface of the hole 180 and only the outer surface 171*i* of the insert 170, and not the inner surface 171*j* of the insert 170, as this is closer to the outer surface of the blade 20. In alternative examples, the electrically conductive member 192 may be positioned adjacent the inner surface 171*j* of the metal insert 170, or a second electrically conductive member 192 may be provided such that a first conductive member 192 is positioned adjacent the outer surface 171*i* and a second conductive member 192 is positioned adjacent the inner surface 171*j*.

Figure 10:
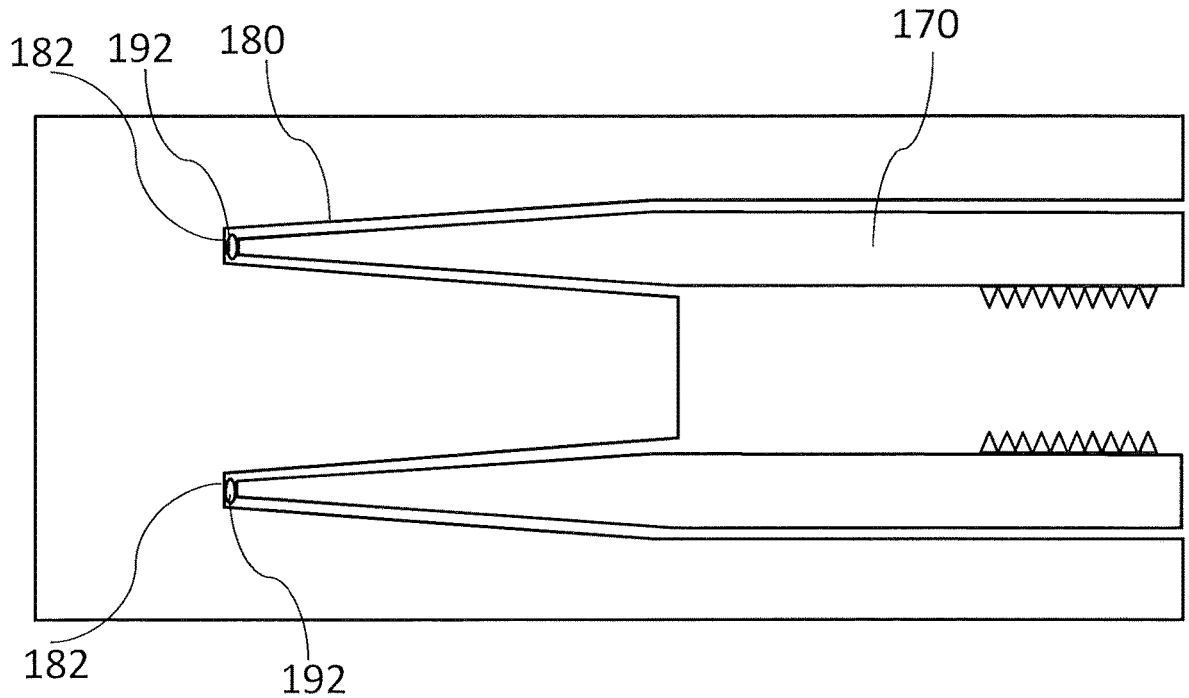
FIG. 10 shows part of the connection joint with an electrically conductive member disposed at a tip end of an insert according to a fifth example.

The hole 180 may be a blind hole, i.e. a hole with a specified depth that does not break through to the other side of the part. In this case, additionally or as an alternative, a conductive member 192 may be positioned between the tip end 174 of the metal insert 170 and the blind end 182 of the blind hole 180, as shown in FIG. 10.

Figure 11:
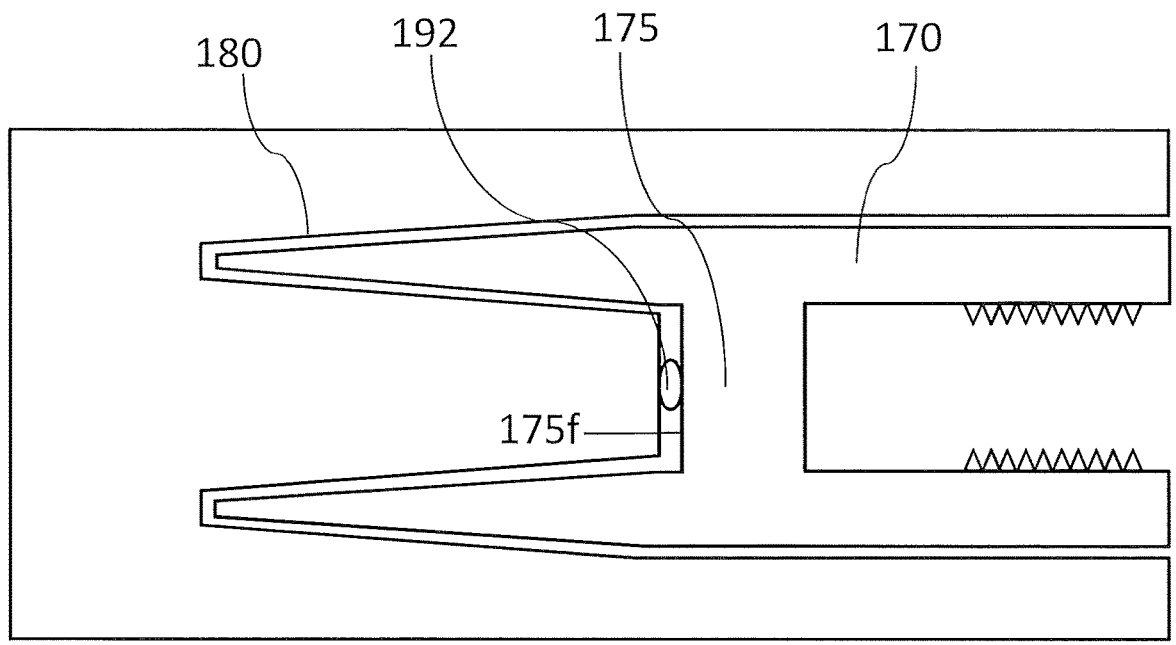
FIG. 11 shows part of the connection joint with an electrically conductive member disposed centrally within a hollow of the insert according to a sixth example.

In the previous examples, the metal insert 170 includes a through hole. In alternative examples, the metal insert 170 may include a central member 175 bridging the hole in the metal insert 170 such that the hole in the insert 170 is a blind hole, as shown in FIG. 11. The central member 175 may have an end face 175*f* facing towards and perpendicular to a circumferential surface of the hole 180, allowing an electrically conductive member 192 to be positioned between the end face 175*f* of the central member 175 and the surface of the hole 180.

Figure 12:
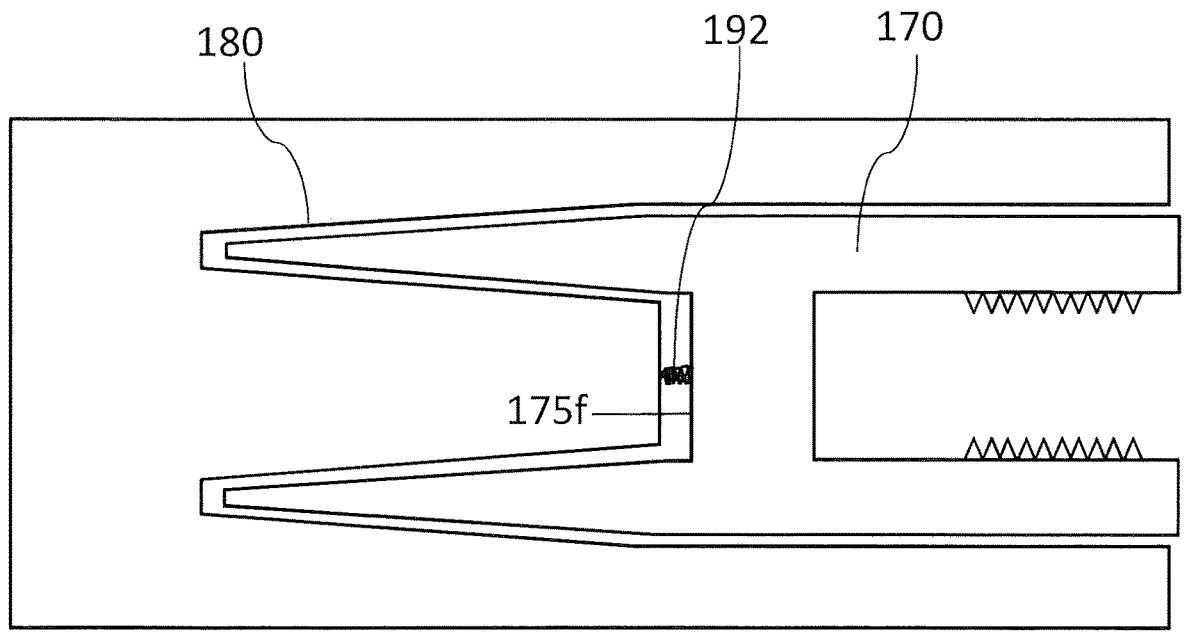
FIG. 12 shows an example in which the electrically conductive member is a spring.

The electrically conductive member 192 may be a spring, such as a helical metal coil as shown in FIG. 12. The spring is an elastic device that is able to deform elastically, and will try to return to its original shape when pressed or pulled, thereby maintaining the electrical path between the metal insert 170 and the hole 180 during use.

The electrically conductive member 192 may be a canted spring (alternatively referred to as a slanted spring). A canted spring may extend circumferentially around the metal insert 170, for example the conductive member 192 shown in FIGS. 8 and 9 may be a canted spring.

The electrically conductive member 192 may be a wire mesh or wire wool, which are deformable and permeable and may be formed of a conductive metal such as copper. The electrically conductive member may be permeable to a flowable adhesive used to join the metal insert in the hole, which subsequently cures to bond the metal insert inside the hole.

The connection joint may include any number of electrically conductive members 192, for example one, two or three conductive members 192. The conductive members 192 may be discrete conductive member 192 or may be electrically connected, for example by electrical wiring.

In addition, or as an alternative, at least a portion of the adhesive coupling the metal insert 170 to the surface of the hole 180 may be an electrically conductive adhesive 196. The electrically conductive adhesive 196 may be an adhesive, such as an epoxy adhesive, containing a concentration of one or more of silver particles, nickel particles, and carbon nanotubes, or any other electrically conductive additive. The electrically conductive adhesive may provide the electrical path between the metal insert and the electrically conductive material of the surface of the hole.

Figure 13:
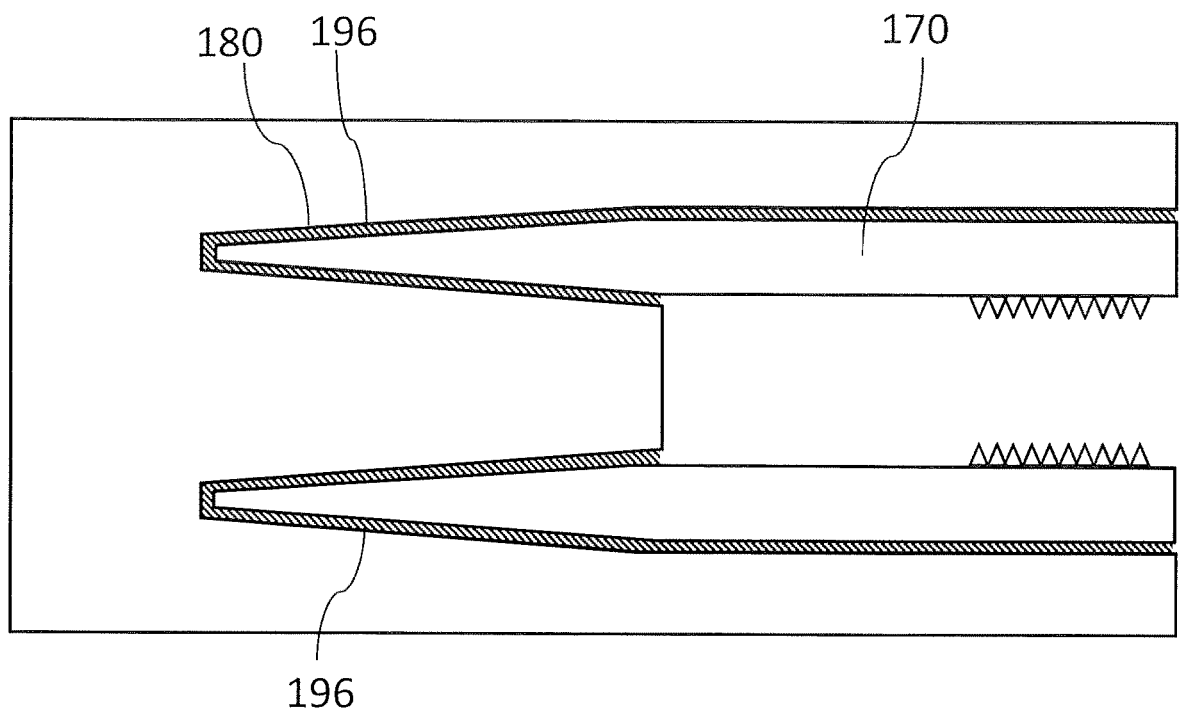
FIG. 13 shows part of the connection joint with an electrically conductive adhesive according to a seventh example.

FIG. 13 shows an example in which substantially all of the adhesive coupling the metal insert 170 to the surface of the hole 180 is an electrically conductive adhesive 196. This maximises the contact surface area between the surface of the metal insert 170 and the surface of the hole 180, and thereby helps to maximise the area or number of electrical paths that are formed between the metal insert 170 and the surface of the hole 180.

Figure 14:
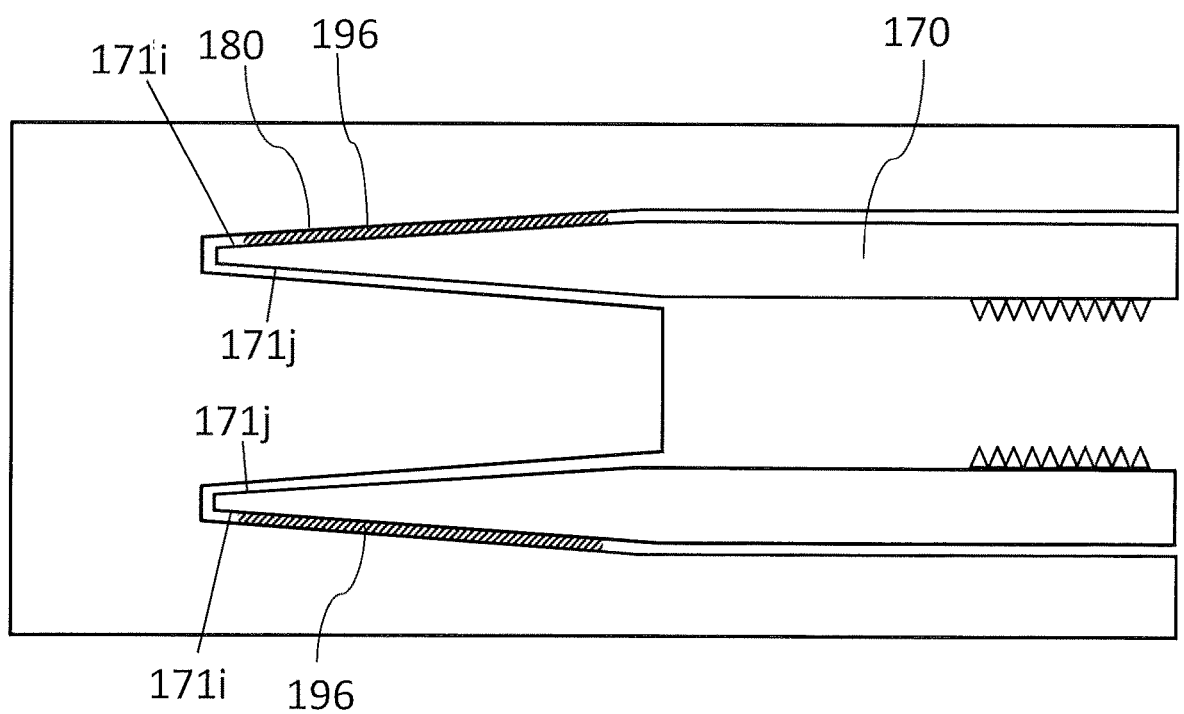
FIG. 14 shows part of the connection joint with an electrically conductive adhesive covering only a portion of the insert and surface of the hole.

FIG. 14 shows an example in which only a portion of the interface between the metal insert 170 and the hole 180 is bonded by an electrically conductive adhesive 196. The electrically conductive adhesive may cover an area less than 50% of the total area of the surface area of the joining surface of the metal insert 170. The remaining interfaces between the metal insert 170 and the hole 180 may include a non-conductive adhesive (not shown). In this case, it may be preferable that the electrically conductive adhesive 196 is bonded to the outer surface 171i of the insert 170, such that an electrical path is formed between the surface of the hole 180 and only the outer surface 171i of the insert 170, and not the inner surface 171j of the insert 170, as this is closer to the outer surface of the blade 20. However, it will be understood that the electrically conductive adhesive 196 may be bonded to any portion of the surface of the metal insert 170 and the corresponding surface of the hole 180. In some examples, there may be two or more patches of electrically conductive adhesive 196 spaced apart.

It will be clear to the skilled person that many of the features described in relation to each example can be appropriately combined with the features of other examples. In some examples, the connection joint between blade portions 122, 124 may combine the features of multiple examples to form multiple types of different electrical paths. For example, the connection joint may include electrical paths formed by an interference fit and/or an electrically conductive member 192 and/or an electrically conductive adhesive 196.

Although the invention has been described above with reference to one or more preferred embodiments, it will be appreciated that various changes or modifications may be made without departing from the scope of the invention as defined in the appended claims.

The invention claimed is:

1. A wind turbine blade, comprising:
   a first blade portion having a shell that defines a suction side, a pressure side, a leading edge, and a trailing edge of the blade, the first blade portion further including a first blade portion end surface at one end of the first blade portion, the first blade portion end surface having a hole formed therein, the first blade portion further comprising first electrically conductive material, wherein a portion of the first electrically conductive material is revealed on a surface of the hole;
   a second blade portion having a shell that defines a suction side, a pressure side, a leading edge, and a trailing edge of the blade, the second blade portion further including a second blade portion end surface at one end of the second blade portion, wherein the first blade portion and the second blade portion are configured to be coupled together at the first and second blade portion end surfaces; and
   a connection joint for coupling the first and second blade portions together, wherein, prior to the first blade portion and the second blade portion being coupled at the connection joint, the connection joint includes a first connection joint portion associated with the first blade portion and a second connection joint portion associated with the second blade portion, and wherein the first connection joint portion comprises:
      a metal insert embedded in the hole of the first blade portion such that a first electrical path is formed between the metal insert and the first electrically conductive material revealed on the surface of the hole.

2. The wind turbine blade according to claim 1, wherein the first electrically conductive material comprises carbon fibres.

3. The wind turbine blade according to claim 1, wherein the metal insert forms an interference fit with the surface of the hole to provide the first electrical path between the metal insert and the first electrically conductive material revealed on the surface of the hole.

4. The wind turbine blade according to claim 3, wherein the interference fit is formed along only a portion of a length of the metal insert embedded in the hole.

5. The wind turbine blade according to claim 1, further comprising an electrically conductive adhesive bonding the metal insert in the hole, wherein the electrically conductive adhesive provides the first electrical path between the metal insert and the first electrically conductive material revealed on the surface of the hole.

6. The wind turbine blade according to claim 5, wherein the electrically conductive adhesive is provided along only a portion of a length of the metal insert embedded in the hole.

7. The wind turbine blade according to claim 1, further comprising an electrically conductive member bridging a gap between the metal insert and the surface of the hole, wherein the electrically conductive member provides the first electrical path between the metal insert and the first electrically conductive material revealed on the surface of the hole.

8. The wind turbine blade according to claim 7, wherein the electrically conductive member is permeable to a flowable adhesive when bonding the insert in the hole.

9. The wind turbine blade according to claim 7, wherein the electrically conductive member is deformable.

10. The wind turbine blade according to claim 7, wherein the electrically conductive member is positioned and/or retained in a recess formed in the hole and/or metal insert.

11. The wind turbine blade according to claim 7, wherein the electrically conductive member is a circumferential collar arranged between the hole and the metal insert.

12. The wind turbine blade according to claim 7, wherein the electrically conductive member is a spring.

13. The wind turbine blade according to claim 7, further comprising a plurality of the electrically conductive members.

14. The wind turbine blade according to claim 1,
wherein the second blade portion further comprises a second electrically conductive material and a second hole formed in the second blade portion end surface, wherein a portion of the second electrically conductive material is revealed on a surface of the second hole;
wherein the second connection joint portion includes a second metal insert embedded in the second hole such that the second metal insert forms a second electrical path with the second electrically conductive material revealed on the surface of the second hole; and
wherein the connection joint further includes a fastener arranged to join the first metal insert to the second metal insert.

15. The wind turbine blade according to claim 1, wherein the first blade portion further comprises an elongate fibre composite body, and the elongate fibre composite body comprises the first electrically conductive material at one end of the elongate fibre composite body.

16. The wind turbine blade according to claim 1, further comprising a lightning protection system, wherein the metal insert is connected to the lightning protection system via the first electrical path between the electrically conductive insert and the first electrically conductive material revealed on the surface of the hole.

17. A method of manufacturing a wind turbine blade comprising:
providing a first blade portion having a shell that defines a suction side, a pressure side, a leading edge, and a trailing edge of the blade, the first blade portion further including a first blade portion end surface at one end of the first blade portion, the first blade portion further comprising a first electrically conductive material and a hole formed in the first blade portion end surface, wherein a portion of the first electrically conductive material is revealed on a surface of the hole, and with a metal insert embedded in the hole to form a first electrical path between the metal insert and the first electrically conductive material revealed on the surface of the hole;
providing a second blade portion, initially separated from the first blade portion, having a shell that defines a suction side, a pressure side, a leading edge, and a trailing edge of the blade, the second blade portion further including a second blade portion end surface at one end of the second blade portion;
bringing the first and second blade portions together such that the first blade portion end surface is adjacent the second blade portion end surface; and,
coupling the first and second blade portions together by the metal insert.

18. The method of manufacturing the wind turbine blade according to claim 17, further comprising:
machining the hole in the first electrically conductive material after curing the first electrically conductive material in the shell of the first blade portion;
introducing the metal insert into the hole;
adhesively bonding the metal insert in the hole; and
forming the first electrical path between the metal insert and the first electrically conductive material revealed on the surface of the hole.

19. The method of manufacturing a wind turbine blade according to claim 17, wherein the second blade portion further comprises a second electrically conductive material and a second hole formed in the second blade portion end surface, wherein a portion of the second electrically conductive material is revealed on a surface of the second hole, and with a second metal insert embedded in the second hole to form a second electrical path between the second metal insert and the second electrically conductive material revealed on the surface of the second hole; and
coupling the first and second blade portions together further comprises:
fastening the metal insert to the second metal insert.

* * * * *